United States Patent
Yoshizaki et al.

(10) Patent No.: US 9,133,781 B2
(45) Date of Patent: Sep. 15, 2015

(54) VEHICLE INTEGRATED CONTROL DEVICE

(75) Inventors: Satoshi Yoshizaki, Gotenba (JP); Shinichi Soejima, Gotenba (JP); Satoru Tanaka, Odawara (JP); Kiyonori Takahashi, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/410,341

(22) PCT Filed: Jun. 28, 2012

(86) PCT No.: PCT/JP2012/066573
§ 371 (c)(1),
(2), (4) Date: Dec. 22, 2014

(87) PCT Pub. No.: WO2014/002230
PCT Pub. Date: Jan. 3, 2014

(65) Prior Publication Data
US 2015/0134214 A1    May 14, 2015

(51) Int. Cl.
*G06F 17/00* (2006.01)
*F02D 41/00* (2006.01)
*B60W 30/02* (2012.01)

(52) U.S. Cl.
CPC ........... *F02D 41/0007* (2013.01); *B60W 30/02* (2013.01)

(58) Field of Classification Search
CPC . F02D 41/0007; F02D 41/0002; B60W 30/02
USPC ...................................... 701/54, 53
See application file for complete search history.

(56) References Cited

U.S. PATENT DOCUMENTS

| | | | |
|---|---|---|---|
| 6,098,592 A | 8/2000 | Hess et al. | |
| 6,830,031 B2* | 12/2004 | Sans | 123/352 |
| 7,340,330 B2* | 3/2008 | Okoshi et al. | 701/22 |
| 2010/0170460 A1* | 7/2010 | Leone et al. | 123/90.16 |
| 2011/0213527 A1 | 9/2011 | Itabashi et al. | |
| 2013/0345948 A1* | 12/2013 | Panciroli | 701/103 |

FOREIGN PATENT DOCUMENTS

| | | |
|---|---|---|
| JP | H09-112329 A | 4/1997 |
| JP | 2007-189157 A | 7/2007 |
| JP | 2008-232069 A | 10/2008 |
| JP | 2009-293602 A | 12/2009 |
| JP | 2010-064645 A | 3/2010 |
| JP | 2010-132254 A | 6/2010 |
| JP | 2010-223122 A | 10/2010 |
| JP | 2010-255586 A | 11/2010 |

* cited by examiner

*Primary Examiner* — David J Hlavka
(74) *Attorney, Agent, or Firm* — Kenyon & Kenyon LLP (57) ABSTRACT

A vehicle integrated control device that can request torque having an appropriate magnitude and change speed to be given to an engine control unit from a drive system manager. A first maximum torque and a second maximum torque are presented to a drive system manager from an engine control unit. The drive system manager refers to the first maximum torque and the second maximum torque which are presented, and determines a request torque to be given to the engine control unit. The first maximum torque is a maximum torque that can be realized when only an operation amount of a throttle is actively changed without actively changing an operation amount of a wastegate valve. The second maximum torque is a maximum torque that can be realized when both the operation amount of the throttle and the operation amount of the wastegate valve are actively changed.

13 Claims, 5 Drawing Sheets

VEHICLE INTEGRATED CONTROL DEVICE

CROSS-REFERENCE TO RELATED APPLICATION

This is a national phase application based on the PCT International Patent Application No. PCT/JP2012/066573 filed Jun. 28, 2012, the entire contents of which are incorporated herein by reference.

TECHNICAL FIELD

The present invention relates to an integrated control device for a vehicle including an internal combustion engine as a power source.

BACKGROUND ART

As a control device for a vehicle including an internal combustion engine as a power source, there is known a vehicle integrated control device that performs control of the internal combustion engine by integrating the control of the internal combustion engine with control of an automatic transmission and a braking device. The vehicle integrated control device is configured by a drive system manager that manages an operation of an entire drive system, an engine control unit that controls the internal combustion engine, a transmission control unit that controls the automatic transmission, a brake control unit that controls the braking device and the like.

In the conventional vehicle integrated control device, torque demand control has been adopted as the method for controlling an internal combustion engine. According to the torque demand control, a request torque is given to the engine control unit from the drive system manager. The request torque includes a driver request torque that is requested by the driver. Furthermore, the request torque includes system request torques that are requested by on-board systems such as a sprung vibration damping control system, a transmission control unit, and a vehicle attitude stability control system. The engine control unit determines an operation amount of the actuator of the internal combustion engine, for example, a throttle, based on the given request torque.

The drive system manager determines a request torque that should be given to the engine control unit by mediating between the request for the torque from the driver and the requests for the torques from the on-board systems. Subsequently, the engine control unit operates the actuators such as the throttle in order to realize the request torque given by the drive system manager. However, depending on the magnitude of the request torque, the request torque cannot be always realized by the internal combustion engine. This is because there is an upper limit to the torque which can be realized by the internal combustion engine. More specifically, in the case of a naturally aspirated internal combustion engine, the torque outputted by the internal combustion engine becomes maximum by fully opening the throttle. The maximum torque does not have a fixed value, but has a variable value that varies in accordance with the engine speed. Furthermore, in the case of an internal combustion engine equipped with a supercharger, the maximum torque capable of being outputted by the internal combustion engine varies in accordance with the supercharging state. Namely, a difference occurs to the torque at the time of the throttle being fully opened depending on whether the supercharging pressure is high or low. The supercharging pressure can be actively controlled by an actuator, for example, a wastegate valve. Accordingly, in the case of the internal combustion engine equipped with a supercharger, which includes a wastegate valve, the torque which is obtained when the throttle is fully opened, and the wastegate valve is completely closed is the maximum torque of the internal combustion engine.

Even if the request torque which exceeds the maximum torque is given to the engine control unit, the internal combustion engine cannot output a torque that exceeds the maximum torque. Further, even if the actuator is operated based on the request torque which cannot be realized by any possibility, drivability would be only degraded. In order to extract the operation performance of the internal combustion engine sufficiently, it is important to give an appropriate request torque to the engine control unit, and in order to do so, the maximum torque capable of being outputted by the internal combustion engine needs to be grasped at the side of the drive system manager.

However, when the control target is an internal combustion engine equipped with a supercharger, an appropriate request torque cannot be determined by only grasping the maximum torque. The request torque which is given to the engine control unit includes a request regarding the magnitude of a torque and a request regarding a change speed of the torque, as information. The maximum torque of the internal combustion engine equipped with a supercharger is the torque which is obtained when the throttle is fully opened, and the wastegate valve is completely closed, and in the entire region of the torque range which does not exceed the maximum torque, the torque change speed which is requested cannot be always realized. This is because while the response speed of the torque to the operation of the throttle is high, the response speed of the torque to the operation of the wastegate valve is low. When the magnitude of the request torque is in the torque range in which an operation of the wastegate valve is required, and the request torque includes a torque component with a high change speed, the torque component with the change speed is unlikely to be realized. In order to prevent control of the internal combustion engine based on a request torque which is unrealizable, it is demanded to give an appropriate request torque including not only a magnitude but also a change speed to the engine control unit.

Note that an internal combustion engine equipped with a supercharger is described as an example here, but the above described problem is a problem that is also applicable to a certain kind of naturally aspirated internal combustion engine. In the internal combustion engine which controls the intake air amount by two kinds of actuators that are provided upstream and downstream of the intake passage, such as an internal combustion engine including a throttle and an intake valve equipped with a variable lift mechanism, there is a difference between the control range of the torque by only the downstream side actuator, and the control range of the torque by an operation of both the actuators. Furthermore, there is also a difference between the response speed of the torque to an operation of the downstream side actuator, and the response speed of the torque to an operation of the upstream side actuator. Accordingly, it is also demanded to give an appropriate request torque including not only a magnitude but also a change speed to the engine control unit which controls the internal combustion engine like this.

The literatures listed as follows are prior art literatures showing the technological level of the technical field relating to the present application.

CITATION LIST

Patent Literature

Patent Literature 1: Japanese Patent Laid-Open No. 2010-223122
Patent Literature 2: Japanese Patent Laid-Open No. 2008-232069
Patent Literature 3: Japanese Patent Laid-Open No. 2009-293602

Patent Literature 4: Japanese Patent Laid-Open No. 2010-255586

Patent Literature 5: Japanese Patent Laid-Open No. 2010-064645

Patent Literature 6: Japanese Patent Laid-Open No. 2010-132254

Patent Literature 7: Japanese Patent Laid-Open No. 2007-189157

SUMMARY OF INVENTION

The present invention is made in the light of the aforementioned problem, and has an object to provide a vehicle integrated control device in which a request torque having an appropriate magnitude and change speed is given to an engine control unit from a drive system manager.

A vehicle integrated control device according to the present invention is a control device that is applied to a vehicle that includes an internal combustion engine as a power source. The internal combustion engine of the vehicle to which the vehicle integrated control device according to the present invention is applied includes a first actuator and a second actuator as actuators relating to torque control thereof.

The first actuator is provided at a first position in an intake passage of the internal combustion engine and acts on a pressure downstream of the first position. A preferable first actuator is an actuator that acts so as to decrease the downstream pressure with respect to a pressure upstream of the first position. Meanwhile, the second actuator is an actuator that is provided at a second position upstream from the first position in the same intake passage, and acts on a pressure downstream of the second position. A preferable second actuator is an actuator that acts so as to increase the downstream pressure with respect to a pressure upstream of the second position. Note that the second actuator may be such an actuator that a change speed of the pressure downstream of the second position to an operation of the actuator is lower than a change speed of the pressure downstream of the first position to an operation of the first actuator. Citing specific examples of the respective actuators, an example of the first actuator is a throttle, and an example of the second actuator is a supercharger equipped with a control device that controls a rotational speed of a compressor, for example, a supercharger equipped with a wastegate valve.

The vehicle integrated control device according to the present invention is configured by at least a drive system manager that manages an operation of an entire drive system of the vehicle, and an engine control unit that controls the internal combustion engine. However, besides them, a transmission control unit that controls an automatic transmission, and a brake control unit that controls a braking device may be further included. The respective control units control mechanical devices which the respective control units are in charge of, based on a request and an instruction from the drive system manager.

The engine control unit includes at least an actuator operation unit, a first maximum torque calculation unit and a second maximum torque calculation unit. The actuator operation unit is programmed to operate the first actuator and the second actuator based on a request torque that is given from the drive system manager. The first maximum torque calculation unit is programmed to calculate a maximum torque (hereinafter, a first maximum torque) that can be realized when only an operation amount of the first actuator is actively changed without actively changing an operation amount of the second actuator, based on an engine speed, and present the first maximum torque to the drive system manager. The second maximum torque calculation unit is programmed to calculate a maximum torque (hereinafter, a second maximum torque) that can be realized when both of the operation amount of the first actuator and the operation amount of the second actuator are actively changed, based on the engine speed, and present the second maximum torque to the drive system manager.

The drive system manager is programmed to refer to the first maximum torque and the second maximum torque which are presented from the engine control unit and determine the request torque to be given to the engine control unit. The first maximum torque is an upper limit value of a torque range that can be realized by an operation of only the first actuator, whereas the second maximum torque is an upper limit value of a torque range that can be realized by operations of both of the first actuator and the second actuator. Therefore, the torque range that is fixed by the second maximum torque is larger than the torque range that is fixed by the first maximum torque. However, in the torque range which is fixed by the first maximum torque, a rapid torque change can be realized by an operation of only the first actuator, whereas in a torque range from the first maximum torque to the second maximum torque, a rapid torque change cannot be realized because an operation of the second actuator is required. The two kinds of maximum torques as above are presented to the drive system manager, whereby the drive system manager can give an appropriate request torque that includes not only a magnitude but also a change speed to the engine control unit.

In a preferable mode of the vehicle integrated control device according to the present invention, the drive system manager includes at least a first request torque calculation unit and a second request torque calculation unit.

The first request torque calculation unit is programmed to refer to the second maximum torque which is presented from the engine control unit and calculate a first request torque that is a torque component with a low change speed. The first request torque calculation unit is preferably programmed to adjust the magnitude of the first request torque to be within a range that does not exceed the second maximum torque. The first request torque can be made what is obtained by converting a request regarding a torque from a driver which is transmitted through an accelerator pedal opening degree, into numbers.

The second request torque calculation unit is programmed to refer to the first maximum torque which is presented from the engine control unit and the first request torque which is calculated by the first request torque calculation unit, and calculate a second request torque that is a torque component with a high change speed. The second request torque calculation unit is preferably programmed to adjust a magnitude of the second request torque to be within a range that does not exceed a margin of the first maximum torque with respect to the first request torque. The second request torque can be made what is obtained by converting, into numbers, a request regarding a torque from at least one of a sprung vibration damping control system, a transmission control unit, and a vehicle attitude stability control system.

The drive system manager gives the first request torque which is calculated in the first request torque calculation unit to the engine control unit, and also gives the second request torque which is calculated in the second request torque calculation unit to the engine control unit. As a mode of supplying these request torques to the engine control unit, there are three preferable modes as follows. According to a first mode, the second request torque is superimposed on the first request torque to generate one signal, and the one signal is given to the engine control unit. According to a second mode, a signal with the second request torque being superimposed on the first request torque and a signal expressing the first request torque are generated, and these two signals are given to the engine control unit. Subsequently, according to a third mode, a signal expressing the first request torque and a signal expressing the second request torque are respectively generated, and the two signals are given to the engine control unit.

Note that if the vehicle integrated control device according to the present invention includes a transmission control unit, the transmission control unit is preferably programmed to control an automatic transmission in accordance with a request transmission gear ratio that is given from the drive system manager. In this case, the drive system manager includes a request transmission gear ratio calculation unit that determines a request transmission gear ratio to be given to the transmission control unit. The request transmission gear ratio calculation unit is programmed to change the request transmission gear ratio to a high transmission gear ratio when a predetermined condition regarding a difference or a ratio of the first maximum torque which is presented from the engine control unit, and the first request torque which is calculated by the first request torque calculation unit is satisfied.

DESCRIPTION OF EMBODIMENTS

Embodiment 1

Hereinafter, embodiment 1 of the present invention will be described with reference to the drawings.

Figure 1:
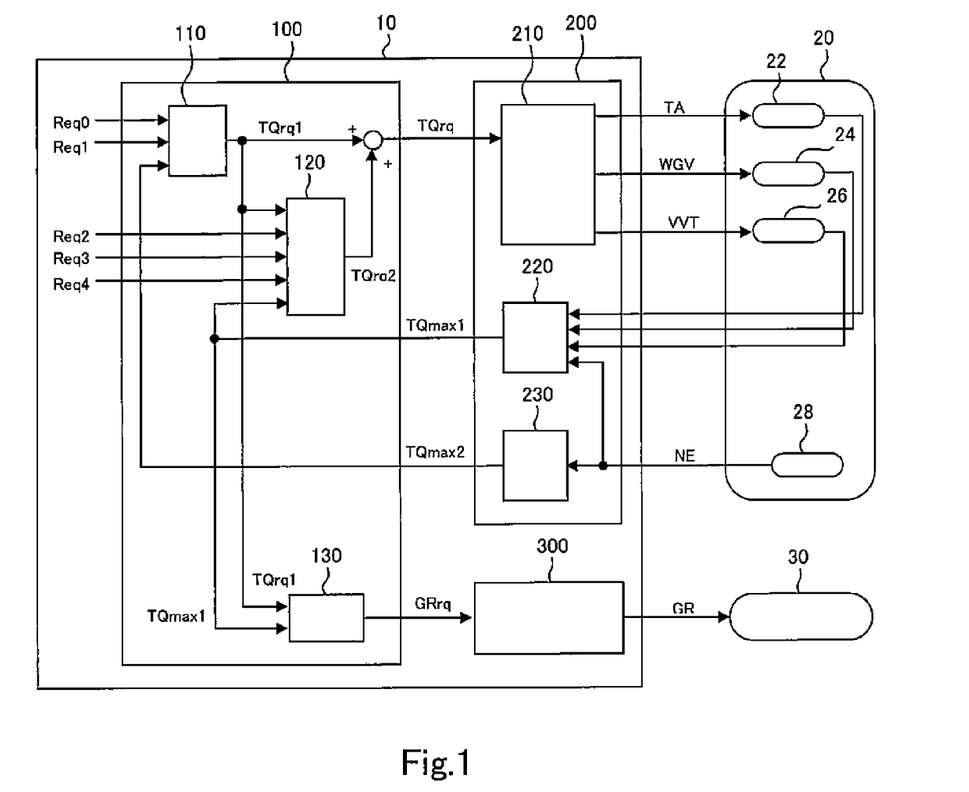
FIG. 1 is a block diagram showing a configuration of a vehicle integrated control device according to embodiment 1 of the present invention.

FIG. 1 is a block diagram showing a configuration of a vehicle integrated control device according to embodiment 1 of the present invention. A vehicle integrated control device 10 according to the present embodiment is formed of one or a plurality of on-board computers, and is programmed as a control device that integrally controls at least an internal combustion engine 20 and an automatic transmission 30.

The internal combustion engine 20 which is a control target is a gasoline engine equipped with a turbo supercharger. A throttle 22 is disposed in an intake passage of the internal combustion engine 20. Further, a turbo supercharger equipped with a wastegate valve 24 is mounted upstream of the throttle 22 in the intake passage. According to the configuration like this, a rotational speed of a compressor of the turbo supercharger is controlled by an operation of the wastegate valve 24, and a supercharging pressure that is a pressure upstream of the throttle 22 can be changed. Subsequently, an intake pipe pressure that is a pressure downstream of the throttle 22 is changed by an operation of the throttle 22, and an intake air amount that determines an output torque of the internal combustion engine 20 can be changed. Namely, the throttle 22 corresponds to a first actuator in the present invention, and an entire turbo supercharger including the wastegate valve 24 corresponds to a second actuator in the present invention. The internal combustion engine 20 further includes a variable valve timing device 26 that changes valve timing of an intake valve. Further, various sensors including an engine speed sensor 28 that outputs a signal corresponding to an engine speed are mounted to the internal combustion engine 20.

The automatic transmission 30 is an electronically controlled automatic transmission that changes a transmission gear ratio in accordance with a command signal. The automatic transmission 30 may be a multistage transmission that changes a transmission gear ratio by combination of a plurality of gears, or may be a continuously variable transmission that changes the transmission gear ratio by changing a diameter of a pulley. Further, the automatic transmission 30 may be a torque converter type transmission or a clutch type transmission.

The vehicle integrated control device 10 includes a drive system manager 100, an engine control unit 200 that controls the internal combustion engine 20, and a transmission control unit 300 that controls the automatic transmission 30. The drive system manager 100 is located in an uppermost position of a command transmission system, and the engine control unit 200 and the transmission control unit 300 are located in a lower position thereof. Besides these units, the vehicle integrated control device 10 includes a brake control unit that controls a braking device and the like, but illustration and explanation thereof will be omitted.

The drive system manager 100 has a function of giving a request torque (TQrq) to the engine control unit 200, and a function of giving a request transmission gear ratio (GRrq) to the transmission control unit 300. Hereinafter, a matter relating to the request torque (TQrq) which is given to the engine control unit 200 from the drive system manager 100 will be described first.

In determination of the request torque (TQrq) which is given to the engine control unit 200, the drive system manager 100 refers to a maximum torque of the internal combustion engine 20 which is presented by the engine control unit 200. The maximum torque presented by the engine control unit 200 includes two kinds of torques that are a first maximum torque (TQmax1) and a second maximum torque (TQmax2). The engine control unit 200 continuously presents both of the two kinds of maximum torques (TQmax1, TQmax2).

The engine control unit 200 includes an actuator operation unit 210 that operates respective actuators based on the request torque (TQrq) which is given by the drive system manager 100, a first maximum torque calculation unit 220 that calculates the first maximum torque (TQmax1), and a second maximum torque calculation unit 230 that calculates the second maximum torque (TQmax2). A configuration of the actuator operation unit 210 is shown in a block diagram of FIG. 2, a configuration of the first maximum torque calculation unit 220 is shown in a block diagram of FIG. 3, and a configuration of the second maximum torque calculation unit 230 is shown in a block diagram of FIG. 4.

Figure 2:
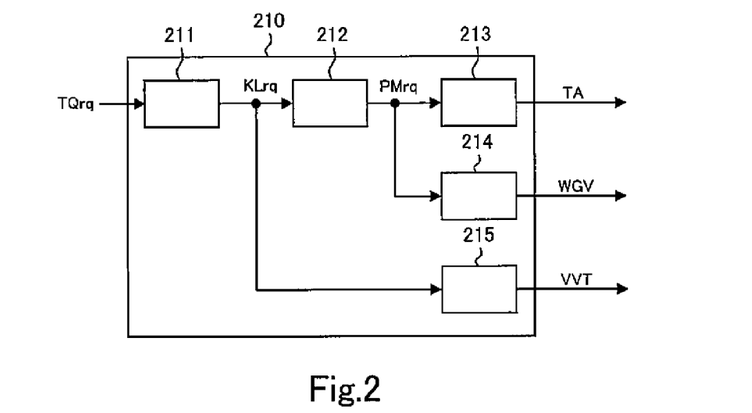
FIG. 2 is a block diagram showing a configuration of an actuator operation unit according to embodiment 1 of the present invention.

The actuator operation unit 210 is configured by five arithmetic elements 211, 212, 213, 214 and 215, as shown in FIG. 2. The arithmetic element 211 calculates an intake air amount which is necessary for realization of the request torque (TQrq) by using a map. In the map, a torque and the intake air amount are related, with various engine state amounts including an engine speed, ignition timing and an air-fuel ratio as keys. The intake air amount which is calculated in the arithmetic element 211 is a request intake air amount (KLrq) with respect to the internal combustion engine 20. The request intake air amount (KLrq) is inputted to the arithmetic element 212 and the arithmetic element 215.

The arithmetic element 212 calculates an intake pipe pressure necessary for realization of the request intake air amount (KLrq) by using a linear function expression. In the linear function expression, a relation of the intake air amount and the intake pipe pressure is defined by using a plurality of coefficients the values of which are determined in accordance with the engine speed, a wastegate valve duty and valve timing. The intake pipe pressure which is calculated in the arithmetic element 212 is a request intake pipe pressure (PMrq) to the internal combustion engine 20. The request intake pipe pressure (PMrq) is inputted to the arithmetic element 213 and the arithmetic element 214.

The arithmetic element 213 calculates a throttle opening degree necessary for realization of the request intake pipe pressure (PMrq) by using an inverse model of an air model. An air model is a physical model obtained by modeling dynamic characteristics of a pressure and a flow rate in the intake passage to the operations of the respective actuators including the throttle 22. According to the inverse model, the operation amount of the actuator necessary to obtain a desired pressure or flow rate can be calculated backwards. The throttle opening degree which is calculated in the arithmetic element 212 is a target throttle opening degree (TA) to the throttle 22. The engine control unit 200 operates the throttle 22 in accordance with the target throttle opening degree (TA).

The arithmetic element 214 calculates an operation amount of the wastegate valve 24 necessary for realization of the request intake pipe pressure (PMrq). The operation amount of the wastegate valve 24 is a duty of a solenoid that causes the wastegate valve 24 to perform an opening and closing operations. In the calculation of the wastegate valve duty, a value obtained by adding a predetermined value to the request intake pipe pressure (PMrq) is determined as a request supercharging pressure first. Subsequently, the wastegate valve duty corresponding to the request supercharging pressure is calculated by using a map or a model that associates the supercharging pressure and the wastegate valve duty with each other. The wastegate valve duty obtained by calculation is a target wastegate valve duty (WGV) to the wastegate valve 24. The engine control unit 200 operates the wastegate valve 24 in accordance with the target wastegate valve duty.

The arithmetic element 215 calculates valve timing suitable for the request intake air amount (KLrq). In the calculation of the valve timing, the valve timing corresponding to the request intake air amount (KLrq) is calculated by using a map or a model that associates the intake air amount and the valve timing with each other. The valve timing that is calculated in the arithmetic element 215 is a target valve timing (VVT) to the variable valve timing device 26. The engine control unit 200 operates the variable valve timing device 26 in accordance with the target valve timing.

Figure 3:
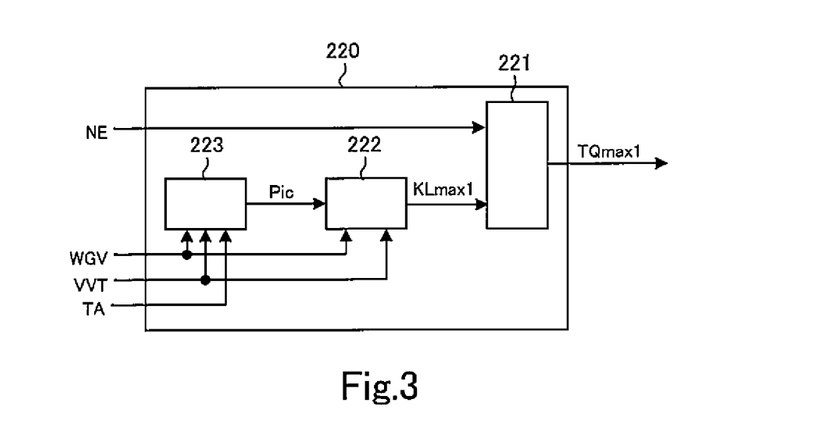
FIG. 3 is a block diagram showing a configuration of a first maximum torque calculation unit according to embodiment 1 of the present invention.

The first maximum torque calculation unit 220 is configured by three arithmetic elements 221, 222 and 223, as shown in FIG. 3. The arithmetic element 223 calculates a supercharging pressure (Pic) that acts on an upstream side of the throttle 22 at the present point of time by using an air model. The air model is a physical model that is obtained by modeling dynamic characteristics of the pressure and the flow rate in the intake passage with respect to the operations of the respective actuators. In the calculation using the air model, the throttle opening degree (TA) at the present point of time, the wastegate valve opening degree (WGV) and the valve timing (VVT) are used as actuator information. The supercharging pressure (Pic) that is calculated in the arithmetic element 223 is inputted to the arithmetic element 222.

The arithmetic element 222 calculates an intake air amount that is obtained when the throttle 22 is opened to a fully opened state under the wastegate valve duty (WGV) and the valve timing (VVT) at the present point of time based on the supercharging pressure (Pic). The intake air amount that is calculated in the arithmetic element 222 is a maximum value of the intake air amount which is realizable by only an operation of the throttle 22. Hereinafter, the intake air amount calculated in the arithmetic element 222 will be called a first maximum intake air amount (KLmax1). The first maximum intake air amount (KLmax1) calculated in the arithmetic element 222 is inputted to the arithmetic element 221.

The arithmetic element 221 calculates a torque that can be outputted by the internal combustion engine 20, based on the first maximum intake air amount (KLmax1) and an engine speed (NE) at the present point of time. The torque that is calculated in the arithmetic element 221 is a first maximum torque (TQmax1). The first maximum torque (TQmax1) means a maximum torque under the engine speed (NE) at the present point of time, which is realizable when only the opening degree of the throttle 22 is changed without changing the opening degree of the wastegate valve 24.

Figure 4:
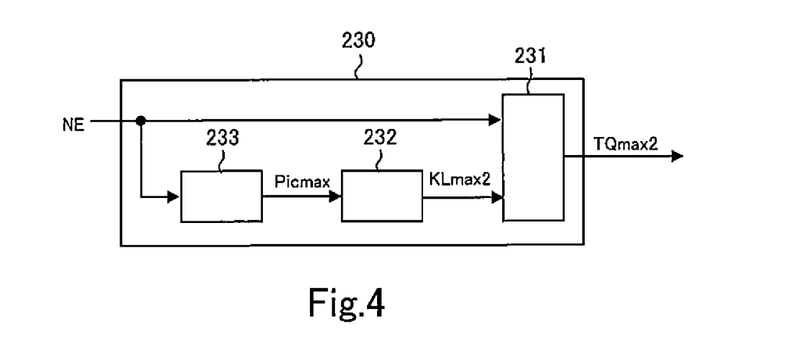
FIG. 4 is a block diagram showing a configuration of a second maximum torque calculation unit according to embodiment 1 of the present invention.

The second maximum torque calculation unit 230 is configured by three arithmetic elements 231, 232 and 233, as shown in FIG. 4. The arithmetic element 233 calculates a maximum supercharging pressure (Picmax) that is realizable in the engine speed (NE) at the present point of time by using a map. The supercharging pressure becomes maximum by completely closing the wastegate valve 24, and a maximum value thereof changes in accordance with the engine speed. Further, an atmospheric pressure and the throttle opening degree also influence the maximum value of the supercharging pressure. In the map, with the standard atmospheric pressure and full opening of the throttle as the preconditions, the maximum supercharging pressure is determined at each engine speed. Note that the maximum supercharging pressure mentioned here is the maximum value of the supercharging pressure which the supercharging pressure finally reaches after the wastegate valve 24 is completely closed. The maximum supercharging pressure (Picmax) that is calculated in the arithmetic element 233 is inputted to the arithmetic element 232.

The arithmetic element 232 calculates an intake air amount that is obtained when the throttle 22 is fully opened, when the wastegate valve 24 is completely closed, and the variable valve timing device 26 is operated to a position where the variable valve timing device 26 makes the intake air amount maximum, based on the maximum supercharging pressure (Picmax). The intake air amount which is calculated in the arithmetic element 232 is a maximum value of the intake air amount, which is realizable by also operating the wastegate valve 24 in addition to the throttle 22. Hereinafter, the intake air amount which is calculated in the arithmetic element 232 will be called a second maximum intake air amount (KLmax2). The second maximum intake air amount (KLmax2) which is calculated in the arithmetic element 232 is inputted to the arithmetic element 231.

The arithmetic element 231 calculates a torque which the internal combustion engine 20 can output based on the second maximum intake air amount (KLmax2) and the engine speed (NE) at the present point of time. The torque which is calculated in the arithmetic element 231 is a second maximum torque (TQmax2). The second maximum torque (TQmax2) means a maximum torque under the engine speed (NE) at the present point of time, which is realizable when the opening degree of the throttle 22 is changed, and the opening degree of the wastegate valve 24 is also changed.

The drive system manager 100 includes a first request torque calculation unit 110 and a second request torque calculation unit 120, as means for calculating the request torque (TQrq) which is given to the engine control unit 200. The first maximum torque (TQmax1) which is calculated in the first maximum torque calculation unit 220 is presented to the second request torque calculation unit 120. The second maximum torque (TQmax2) which is calculated in the the second maximum torque calculation unit 230 is presented to the first request torque calculation unit 110. Hereinafter, respective functions of the first request torque calculation unit 110 and the second request torque calculation unit 120 will be described. Note that the drive system manager 100 further includes a request transmission gear ratio calculation unit 130 that calculates the request transmission gear ratio (GRrq) which is given to the transmission control unit 300. A function of the request transmission gear ratio calculation unit 130 will be described later.

The first request torque calculation unit 110 calculates a first request torque (TQrq1) constituted of a torque component with a low change speed out of the request torques to the internal combustion engine 20. To the first request torque calculation unit 110, a request (Rq0) regarding a torque from a driver, which is transmitted through an accelerator pedal opening degree, and a request (Rq1) regarding a torque from an automatic cruising system are inputted. The first request torque calculation unit 110 mediates these requests, and determines a magnitude of the first request torque (TQrq1) based on the mediation result. At this time, the second maximum torque (TQmax2) which is presented by the second maximum torque calculation unit 230 is referred to, and the magnitude of the first request torque (TQrq1) is adjusted in a range that does not exceed the second maximum torque (TQmax2). When the magnitude of the first request torque (TQrq1) is determined based on the request (Rq0) from the driver, for example, if the request (Rq0) corresponds to a maximum accelerator pedal opening degree, the first request torque (TQrq1) is made to have the magnitude which is adapted to the second maximum torque (TQmax2).

The second request torque calculation unit 120 calculates a second request torque (TQrq2) that is constituted of a torque component with a high change speed out of the request torques to the internal combustion engine 20. To the second request torque calculation unit 120, a request (Rq2) regarding a torque from the sprung vibration damping control system, a request (Rq3) regarding a torque from the transmission control unit, and a request (Rq4) regarding a torque from the vehicle attitude stability control system are inputted. These requests are the request to vibrate a torque at a high frequency, and the request to change a torque in a pulse form. The second request torque calculation unit 120 mediates these requests and determines a magnitude of the second request torque (TQrq2) based on the mediation result. At this time, the second request torque calculation unit 120 refers to the first maximum torque (TQmax1) which is presented from the first maximum torque calculation unit 220, and the first request torque (TQrq1) which is calculated in the first request torque calculation unit 110, and adjusts the magnitude of the second request torque (TQrq2) to be finally outputted.

Figure 5:
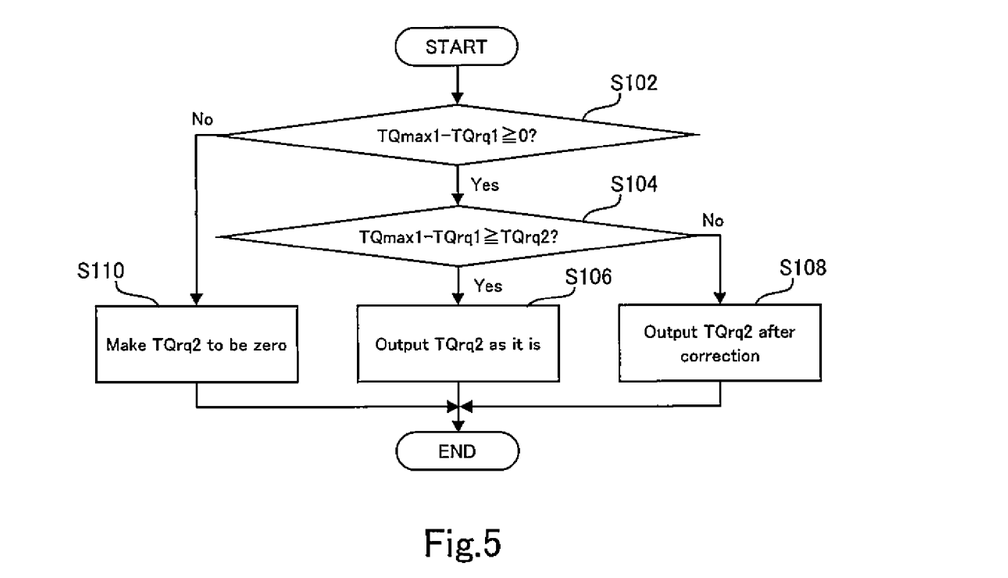
FIG. 5 is a flowchart showing processing which is executed by a second request torque calculation unit according to embodiment 1 of the present invention.

The second request torque calculation unit 120 adjusts the magnitude of the second request torque (TQrq2) to be finally outputted, in accordance with a procedure shown in a flowchart in FIG. 5. First, in step S102, it is determined whether or not a margin of the first maximum torque (TQmax1) with respect to the first request torque (TQrq1) is equal to or larger than zero. If a difference between the first maximum torque (TQmax1) and the first request torque (TQrq1) is equal to or larger than zero, determination in step S104 is further performed. In step S104, it is determined whether or not the difference between the first maximum torque (TQmax1) and the first request torque (TQrq1) is equal to or larger than the second request torque (TQrq2) which is calculated based on the respective requests.

When the result of the determination in step S102 is affirmative, and the result of the determination in step S104 is also affirmative, step S106 is selected. When step S106 is selected, the second request torque calculation unit 120 outputs the second request torque (TQrq2) which is calculated based on the respective requests, with an intact magnitude.

When the result of the determination in step S102 is affirmative, and the result of the determination in step S104 is negative, step S108 is selected. When step S108 is selected, the second request torque calculation unit 120 corrects the magnitude of the second request torque (TQrq2) which is calculated based on the respective requests, and makes the magnitude of the second request torque (TQrq2) to be finally outputted equal to or smaller than the difference between the first maximum torque (TQmax1) and the first request torque (TQrq1). Namely, the magnitude of the second request torque (TQrq2) is corrected so that a value obtained by adding the second request torque (TQrq2) to the first request torque (TQrq1) does not exceed the first maximum torque (TQmax1).

When the result of the determination in step S102 is negative, step S110 is selected. When step S110 is selected, the second request torque calculation unit 120 makes the magnitude of the second request torque (TQrq2) to be outputted, zero.

The drive system manager 100 adds up the second request torque (TQrq2) which is outputted from the second request torque calculation unit 120 to the first request torque (TQrq1) which is outputted from the first request torque calculation unit 110. Subsequently, the drive system manager 100 gives the total value to the engine control unit 200 as the final request torque (TQrq).

Figure 6:
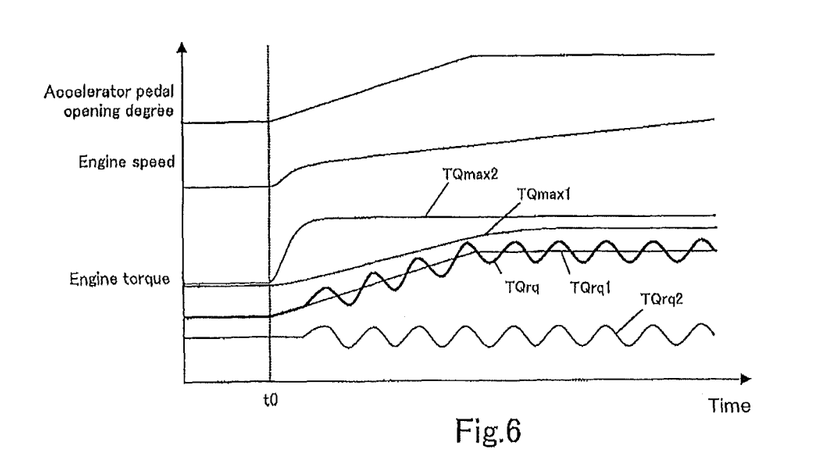
FIG. 6 is a time chart showing a specific example of a calculation result of a request torque by the vehicle integrated control device according to embodiment 1 of the present invention.
Figure 7:
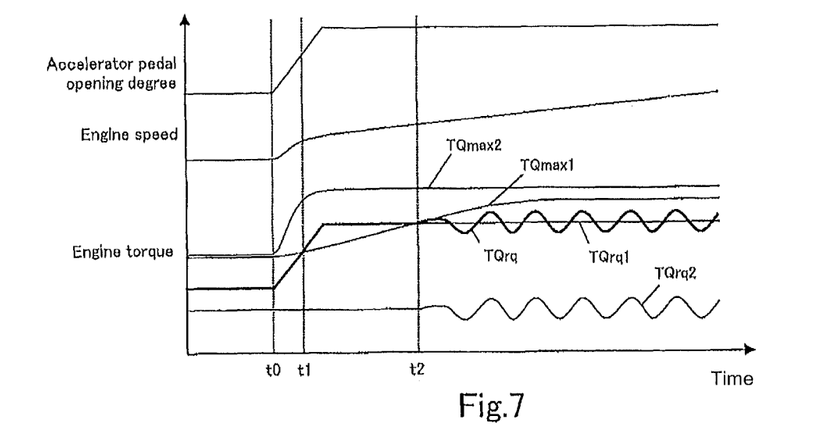
FIG. 7 is a time chart showing a specific example of the calculation result of the request torque by the vehicle integrated control device according to embodiment 1 of the present invention.

FIG. 6 and FIG. 7 show examples of the calculation result of the request torque (TQrq) which is given to the engine control unit 200 from the drive system manager 100 in time charts together with the respective calculation results of the first maximum torque (TQmax1), the second maximum torque (TQmax2), the first request torque (TQrq1) and the second request torque (TQrq2), and the engine speed. In each of the examples shown in FIG. 6 and FIG. 7, an operation of depressing the accelerator pedal is performed by the driver at a time point t0. However, in the example shown in FIG. 6, the accelerator pedal opening degree gradually changes, whereas in the example shown in FIG. 7, the accelerator pedal opening degree changes at a high speed. That is to say, in the example shown in FIG. 6, the driver requests gentle acceleration, whereas in the example shown in FIG. 7, the driver requests sudden acceleration. Further, in both the examples shown in FIG. 6 and FIG. 7, immediately after the accelerator pedal operation by the driver, a vibration damping torque for restraining pitching of the vehicle body is requested from the sprung vibration damping control system. The vibration damping torque is a torque that vibrates at a high frequency, and is outputted by being included in the second request torque (TQrq2).

In the example shown in FIG. 6, the first request torque (TQrq1) which is calculated based on the accelerator pedal opening degree does not exceed the first maximum torque (TQmax1) which can be realized by only an operation of the throttle 22. Further, there is a sufficient margin between the first maximum torque (TQmax1) and the first request torque (TQrq1). Accordingly, the determination result in step S102 described above and the determination result in step S104 are both affirmative, and the second request torque (TQrq2) which vibrates at a high frequency is superimposed with an intact magnitude on the first request torque (TQrq1). Thereby, to the engine control unit 200, the request torque (TQrq) which vibrates at a high frequency while increasing in response to an increase in the accelerator pedal opening degree is given. The request torque (TQrq) remains in the torque range with the first maximum torque (TQmax1) as the upper limit, and therefore, the vibration component at a high frequency that the request torque (TQrq) has is realized by an operation of the throttle 22. Since the response speed of the torque to the operation of the throttle 22 is high, the torque including the vibration component as is requested is outputted from the internal combustion engine 20.

In the example shown in FIG. 7, the first request torque (TQrq1) which is calculated based on the accelerator pedal opening degree increases at a high speed, and exceeds the first maximum torque (TQmax1) which can be realized by only an operation of the throttle 22. In a time period from a time point t1 to a time point t2 in which the first request torque (TQrq1) is larger than the first maximum torque (TQmax1), the determination result in step S102 described above is negative, and the second request torque (TQrq2) which is finally outputted from the second request torque calculation unit 120 is made zero. Therefore, in the time period from the time point t1 to the time point t2, the final request torque (TQrq) is configured by only the first request torque (TQrq1). Subsequently, after the first request torque (TQrq1) becomes smaller than the first maximum torque (TQmax1), and the determination result in step S102 described above becomes affirmative, the second request torque (TQrq2) which vibrates at a high frequency is outputted from the second request torque calculation unit 120, and the second request torque (TQrq2) is superimposed on the first request torque (TQrq1). Thereby, after the time point t2 when the first request torque (TQrq1) becomes smaller than the first maximum torque (TQmax1), the request torque (TQrq) which vibrates at a high frequency is given to the engine control unit 200. The request torque (TQrq) which is given after the time point t2 is within the torque range with the first maximum torque (TQmax1) as the upper limit, and therefore, the vibration component at a high frequency which the request torque (TQrq) has is realized by an operation of the throttle 22 by the engine control unit 200 by the request torque (TQrq) being given to the engine control unit 200.

Next, a matter concerning the request transmission gear ratio (GRrq) which is given to the transmission control unit 300 from the drive system manager 100 will be described. The transmission control unit 300 operates the automatic transmission 30 in accordance with the request transmission gear ratio (GRrq) which is given from the drive system manager 100. Note that the concept of the transmission gear ratio mentioned here includes gear stages when the automatic transmission 30 is a multistage transmission.

The drive system manager 100 includes the request transmission gear ratio calculation unit 130. To the request transmission gear ratio calculation unit 130, the first maximum torque (TQmax1) which is presented from the first maximum torque calculation unit 220 of the engine control unit 200, and the first request torque (TQrq1) which is calculated in the first request torque calculation unit 110 are inputted. The request transmission gear ratio calculation unit 130 determines the request transmission gear ratio (GRrq) to be given to the transmission control unit 300, based on various kinds of information. The first maximum torque (TQmax1) and the first request torque (TQrq1) are part of the information which is used in determination of the request transmission gear ratio (GRrq).

Figure 8:
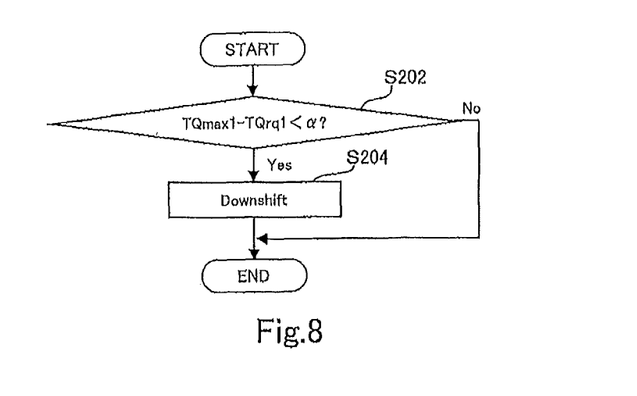
FIG. 8 is a flowchart showing processing that is executed by a request transmission gear ratio calculation unit according to embodiment 1 of the present invention.

Determination of the request transmission gear ratio (GRrq) based on the first maximum torque (TQmax1) and the first request torque (TQrq1) is performed in accordance with a procedure shown in a flowchart in FIG. 8. In step S202, it is determined whether or not a difference between the first maximum torque (TQmax1) and the first request torque (TQrq1) is smaller than a predetermined value $\alpha$. Subsequently, when a result of the determination in step S202 is affirmative, step S204 is selected. When step S204 is selected, the request transmission gear ratio calculation unit 130 makes the request transmission gear ratio (GRrq) to be given to the transmission control unit 300 large to cause the automatic transmission 30 to downshift. The transmission gear ratio is made large by causing the automatic transmission 30 to downshift, and thereby, the engine speed of the internal combustion engine 20 is increased, whereby the first maximum torque (TQmax1) which can be outputted by the internal combustion engine can be increased. When the result of the determination in step S202 is negative, the request transmission gear ratio calculation unit 130 keeps the present request transmission gear ratio (GRrq).

Note that in place of the determination in step S202, it may be determined whether or not a ratio of the first maximum torque (TQmax1) to the first request torque (TQrq1) is smaller than a predetermined value. Further, it may be determined whether or not a state in which the difference between the first maximum torque (TQmax1) and the first request torque (TQrq1) is smaller than a predetermined value continues for a predetermined time period, or it may be determined whether or not a state in which the ratio of the first maximum torque (TQmax1) to the first request torque (TQrq1) is lower than a predetermined value continues for a predetermined time period.

Figure 9:
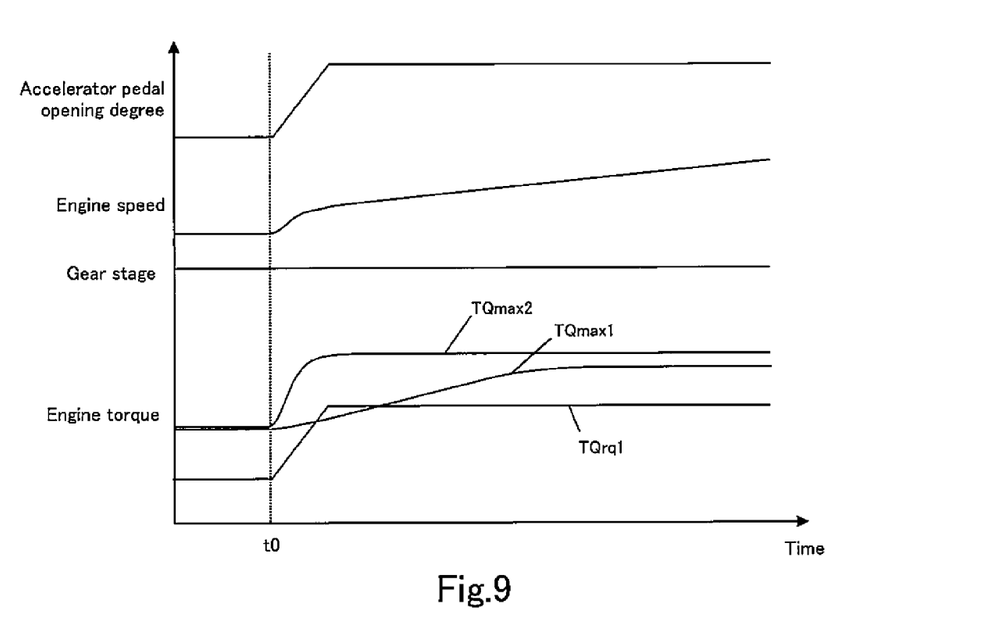
FIG. 9 is a time chart showing a specific example of a control result of a gear stage by the vehicle integrated control device according to embodiment 1 of the present invention.
Figure 10:
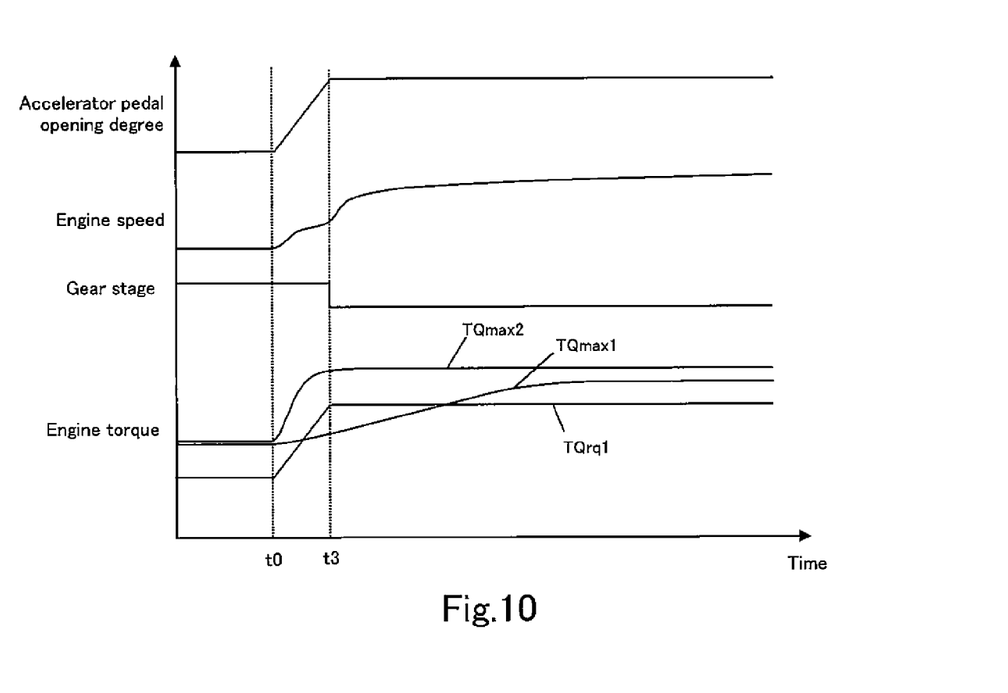
FIG. 10 is a time chart showing a specific example of the control result of the gear stage by the vehicle integrated control device according to embodiment 1 of the present invention.

FIG. 9 and FIG. 10 show examples of the control result of the gear stage of the automatic transmission 30 in time charts together with the respective calculation results of the first maximum torque (TQmax1), the second maximum torque (TQmax2) and the first request torque (TQrq1), and the engine speed. In each of the examples shown in FIG. 9 and FIG. 10, an operation of depressing the accelerator pedal is performed by the driver at a time point t0. However, in the example shown in FIG. 9, the accelerator pedal opening degree gradually changes, whereas in the example shown in FIG. 10, the accelerator pedal opening degree changes at a high speed. That is to say, in the example shown in FIG. 9, the driver requests gentle acceleration, whereas in the example shown in FIG. 10, the driver requests sudden acceleration.

In the example shown in FIG. 9, the first request torque (TQrq1) which is calculated based on the accelerator pedal opening degree does not exceed the first maximum torque (TQmax1) which can be realized by only an operation of the throttle 22. Accordingly, the determination result in step S202 described above is negative, and the request transmission gear ratio (GRrq) which is given to the transmission control unit 300 from the request transmission gear ratio calculation unit 130 is kept after start of acceleration. As a result, the gear stage of the automatic transmission 30 is not changed, and the present gear stage is kept as it is.

In the example shown in FIG. 10, the first request torque (TQrq1) which is calculated based on the accelerator pedal opening degree increases at a high speed, and exceeds the first maximum torque (TQmax1) which can be realized by only an operation of the throttle 22. Therefore, an operation of the wastegate valve 24 becomes necessary to realize the first request torque (TQrq1), and a delay in increase of the torque due to a turbo lag occurs. In this case, at a time point t3 when the difference between the first maximum torque (TQmax1) and the first request torque (TQrq1) becomes smaller than the predetermined value α, the determination result in step S204 described above becomes affirmative, and the request transmission gear ratio (GRrq) which is given to the transmission control unit 300 from the request transmission gear ratio calculation unit 130 is made large. As a result, a downshift operation of the automatic transmission 30 by the transmission control unit 300 is performed, and the gear stage of the automatic transmission 30 is made lower by a predetermined stage than before the acceleration. The engine speed increases significantly by making the gear stage of the automatic transmission 30 low, and with this, the first maximum torque (TQmax1) increases, whereby the turbo lag is eliminated.

Embodiment 2

Next, embodiment 2 of the present invention will be described with use of the drawings.

Figure 11:
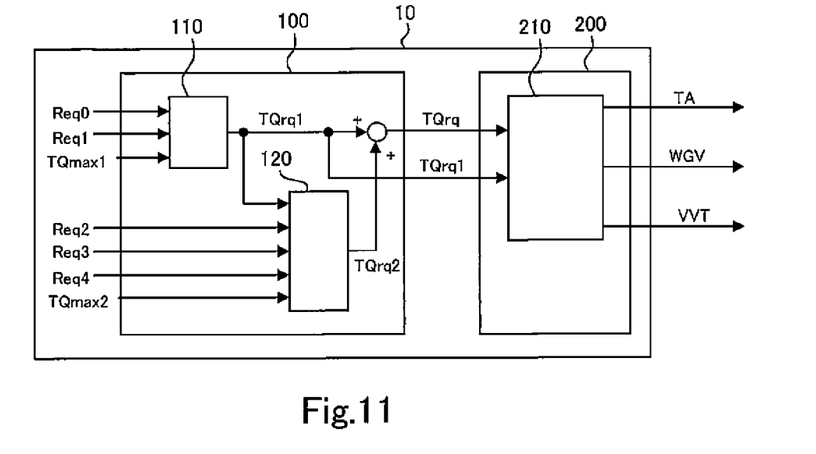
FIG. 11 is a block diagram showing a configuration of a vehicle integrated control device according to embodiment 2 of the present invention.

FIG. 11 is a block diagram showing a configuration of a vehicle integrated control device according to embodiment 2 of the present invention. The vehicle integrated control device according to the present embodiment corresponds to what is obtained by partially modifying the configuration of the vehicle integrated control device according to embodiment 1. Therefore, FIG. 11 only shows components relating to a difference from the vehicle integrated control device according to embodiment 1.

In the vehicle integrated control device according to the present embodiment, the request torque (TQrq) which is made by superimposing the first request torque (TQrq1) and the second request torque (TQrq2) is given to the engine control unit 200 from the drive system manager 100. Further, in parallel therewith, the first request torque (TQrq1) is also given to the engine control unit 200 from the drive system manager 100.

Figure 12:
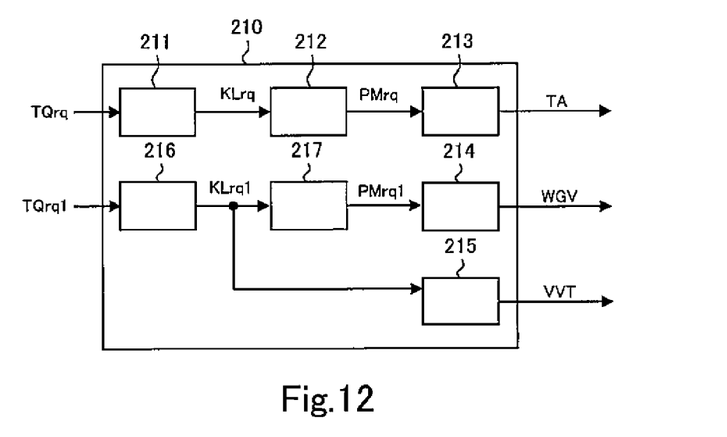
FIG. 12 is a block diagram showing a configuration of an actuator operation unit according to embodiment 2 of the present invention.

FIG. 12 is a block diagram showing a configuration of the actuator operation unit 210 according to the present embodiment. Out of the elements configuring the actuator operation unit 210, elements common in the functions to embodiment 1 are assigned with the same reference signs in the figure. In the actuator operation unit 210 according to the present embodiment, the request intake air amount (KLrq) is calculated from the request torque (TQrq) by the arithmetic element 211, and the request intake pipe pressure (PMrq) is calculated from the request intake air amount (KLrq) by the arithmetic element 212. Subsequently, the target throttle opening degree (TA) is calculated from the request intake pipe pressure (PMrq) by the arithmetic element 212.

Further, in parallel therewith, a request intake air amount (KLrq1) is also calculated from the first request torque (TQrq1) by an arithmetic element 216. Subsequently, a request intake pipe pressure (PMrq1) is calculated from the request intake air amount (KLrq1) by an arithmetic element 217. The request intake pipe pressure (PMrq1) which is calculated in the arithmetic element 217 is inputted to the arithmetic element 214, and in the arithmetic element 214, the target wastegate valve duty (WGV) is calculated based on the request intake pipe pressure (PMrq1). Further, the request intake air amount (KLrq1) calculated in the arithmetic element 216 is inputted to the arithmetic element 215, and in the arithmetic element 215, the target valve timing (VVT) is calculated based on the request intake air amount (KLrq1).

The request intake air amount (KLrq) and the request intake pipe pressure (PMrq) which are calculated based on the request torque (TQrq) include components corresponding to a torque component with a high change speed that is contained in the request torque (TQrq). In contrast with this, the request intake air amount (KLrq1) and the request intake pipe pressure (PMrq1) which are calculated based on the first request torque (TQrq1) do not include components with a high change speed as above. Therefore, by operating the wastegate valve 24 and the variable valve timing device 26 in accordance with the target wastegate vale duty (WGV) and the target valve timing (VVT) which are determined based thereon, useless movements of these actuators can be restrained.

Embodiment 3

Next, embodiment 3 of the present invention will be described with use of the drawings.

Figure 13:
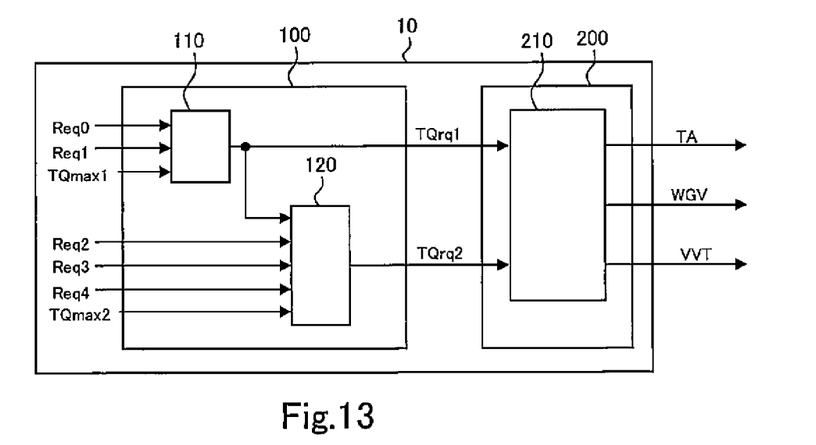
FIG. 13 is a block diagram showing a configuration of a vehicle integrated control device according to embodiment 3 of the present invention.

FIG. 13 is a block diagram showing a configuration of a vehicle integrated control device according to embodiment 3 of the present invention. The vehicle integrated control device according to the present embodiment corresponds to what is obtained by partially modifying the configuration of the vehicle integrated control device according to embodiment 1. Therefore, FIG. 13 only shows components relating to a difference from the vehicle integrated control device according to embodiment 1.

In the vehicle integrated control device according to the present embodiment, the first request torque (TQrq1) and the second request torque (TQrq2) are separately given to the engine control unit 200 from the drive system manager 100. In the actuator operation unit 210 in the engine control unit 200, the request torque (TQrq) in which the first request torque (TQrq1) and the second request torque (TQrq2) which are given are superimposed is calculated, and by the method similar to the method according to embodiment 1, the target throttle opening degree (TA), the target wastegate valve duty (WGV) and the target valve timing (VVT) are calculated from the request torque (TQrq). Alternatively, by the method similar to the method according to embodiment 2, the target throttle opening degree (TA) is calculated from the request torque (TQrq), and the target wastegate valve duty (WGV) and the target valve timing (VVT) are calculated from the first request torque (TQrq1).

Others

The present invention is not limited to the aforementioned embodiments, and can be carried out by being variously modified within the range without departing from the gist of the present invention. For example, the variable valve timing devices included by the internal combustion engines in the aforementioned embodiments are not essential in the present invention. At least a throttle and a turbo supercharger equipped with a wastegate valve can be included in the internal combustion engine.

Further, the vehicle integrated control device according to the present invention can be applied to not only the internal combustion engine having a turbo supercharger equipped with a wastegate valve, but also an internal combustion engine having a variable displacement turbo supercharger, an internal combustion engine having a mechanical supercharger equipped with an electromagnetic clutch, or an internal combustion engine having an electrically driven supercharger. Namely, any internal combustion engine that has a supercharger equipped with a control device that controls the rotational speed of a compressor can be made the control target of the vehicle integrated control device according to the present invention. In this case, the throttle is regarded as the first actuator, and the supercharger equipped with a control device is regarded as the second actuator.

Furthermore, the first actuator and the second actuator in the vehicle integrated control device according to the present invention are not limited to a combination of the throttle and the supercharger equipped with a control device. For example, to any internal combustion engine that is provided with an intake control valve downstream of the throttle in the intake passage, the control device according to the present invention can be applied by regarding the intake control valve as the first actuator, and the throttle as the second actuator. Further, if the intake valve is an intake valve in which a lift amount or an operation angle is variable, the intake valve is regarded as the first actuator, whereas the throttle is regarded as the second actuator, and the vehicle integrated control device according to the present invention can be applied.

REFERENCE SIGNS LIST

10 Vehicle integrated control device
20 Internal combustion engine
22 Throttle
24 Wastegate valve
26 Variable valve timing device
28 Engine speed sensor
30 Automatic transmission
100 Drive system manager
110 First request torque calculation unit
120 Second request torque calculation unit
130 Request transmission gear ratio calculation unit
200 Engine control unit
210 Actuator operation unit
220 First maximum torque calculation unit
230 Second maximum torque calculation unit
300 Transmission control unit

The invention claimed is:

1. A vehicle integrated control device comprising, as a power source, an internal combustion engine that has a first actuator that is provided at a first position in an intake passage and acts on a pressure downstream of the first position, and a second actuator that is provided at a second position upstream from the first position in the intake passage and acts on a pressure downstream of the second position, comprising:

a drive system manager that manages an operation of an entire drive system of a vehicle; and an engine control unit that controls the internal combustion engine, wherein the engine control unit comprises an actuator operation unit that operates the first actuator and the second actuator based on a request torque that is given by the drive system manager, a first maximum torque calculation unit that calculates a first maximum torque that can be realized when only an operation amount of the first actuator is actively changed without actively changing an operation amount of the second actuator, based on an engine speed, and presents the first maximum torque to the drive system manager, and a second maximum torque calculation unit that calculates a second maximum torque that can be realized when both of the operation amount of the first actuator and the operation amount of the second actuator are actively changed, based on the engine speed, and presents the second maximum torque to the drive system manager, and the drive system manager comprises a first request torque calculation unit that refers to the second maximum torque which is presented from the engine control unit, and calculates a first request torque to be given to the engine control unit, and a second request torque calculation unit that refers to the first maximum torque which is presented from the engine control unit and the first request torque, and calculates a second request torque to be given to the engine control unit that is a torque component having a change speed faster than the first request torque.

2. The vehicle integrated control device according to claim 1, wherein the first request torque calculation unit adjusts a magnitude of the first request torque to be within a range which does not exceed the second maximum torque.

3. The vehicle integrated control device according to claim 1, wherein the second request torque calculation unit adjusts a magnitude of the second request torque to be within a range that does not exceed a margin of the first maximum torque with respect to the first request torque.

4. The vehicle integrated control device according to claim 1, wherein the first request torque calculation unit generates the first request torque based on a request from a driver.

5. The vehicle integrated control device according to claim 1, wherein the second request torque calculation unit generates the second request torque based on a request from at least one of a sprung vibration damping control system, a transmission control unit and a vehicle attitude stability control system.

6. The vehicle integrated control device according to claim 1,
wherein the drive system manager superimposes the second request torque on the first request torque and generates one signal, and gives the one signal to the engine control unit.

7. The vehicle integrated control device according to claim 1,
wherein the drive system manager generates a signal in which the second request torque is superimposed on the first request torque, and a signal expressing the first request torque, and gives the two signals to the engine control unit.

8. The vehicle integrated control device according to claim 1,
wherein the drive system manager generates a signal expressing the first request torque and a signal expressing the second request torque, and gives the two signals to the engine control unit.

9. The vehicle integrated control device according to claim 1, further comprising:
a transmission control unit that controls an automatic transmission in accordance with a request transmission gear ratio that is given by the drive system manager,
wherein the drive system manager further comprises a request transmission gear ratio calculation unit that determines the request transmission gear ratio to be given to the transmission control unit, and
the request transmission gear ratio calculation unit changes the request transmission gear ratio to a transmission gear ratio higher than a present transmission gear ratio when a predetermined condition regarding a difference or a ratio of the first maximum torque and the first request torque is satisfied.

10. The vehicle integrated control device according to claim 1,
wherein the first actuator is an actuator that acts so as to decrease the downstream pressure with respect to a pressure upstream of the first position, and
the second actuator is an actuator that acts so as to increase the downstream pressure with respect to a pressure upstream of the second position.

11. The vehicle integrated control device according to claim 1,
wherein the second actuator is such an actuator that a change speed of the pressure downstream of the second position to an operation of the actuator is lower than a change speed of the pressure downstream of the first position to an operation of the first actuator.

12. The vehicle integrated control device according to claim 10,
the first actuator is a throttle, and
the second actuator is a supercharger equipped with a control device that controls a rotational speed of a compressor.

13. The vehicle integrated control device according to claim 12, wherein the second actuator is a turbo supercharger equipped with a wastegate valve.

* * * * *